United States Patent
Pittman et al.

(10) Patent No.: US 12,220,081 B2
(45) Date of Patent: Feb. 11, 2025

(54) AUTOMATED BROILER WITH PRODUCT SENSOR SYSTEM

(71) Applicant: Nieco, LLC, Windsor, CA (US)

(72) Inventors: Joel S. Pittman, Windsor, CA (US); Michael D. Janney, Windsor, CA (US)

(73) Assignee: NIECO, LLC, Windsor, CA (US)

(*) Notice: Subject to any disclaimer, the term of this patent is extended or adjusted under 35 U.S.C. 154(b) by 939 days.

(21) Appl. No.: 17/303,054

(22) Filed: May 19, 2021

(65) Prior Publication Data
US 2022/0369859 A1   Nov. 24, 2022

(51) Int. Cl.
A47J 37/04   (2006.01)
A47J 36/32   (2006.01)

(52) U.S. Cl.
CPC .......... A47J 37/044 (2013.01); A47J 36/32 (2013.01)

(58) Field of Classification Search
None
See application file for complete search history.

(56) References Cited

U.S. PATENT DOCUMENTS

| | | | | |
|---|---|---|---|---|
| 3,570,391 A * | 3/1971 | Rejler | ............. | A47J 37/044 99/468 |
| 4,366,177 A * | 12/1982 | Wells | ............. | A21B 1/48 426/243 |
| 6,201,218 B1 * | 3/2001 | Chandler | ............. | A47J 37/0857 198/860.5 |
| 6,386,095 B1 * | 5/2002 | Ausaf | ............. | A47J 37/044 99/421 H |
| 2006/0102165 A1 * | 5/2006 | Lockhart | ............. | F24C 15/12 126/192 |
| 2012/0070553 A1 * | 3/2012 | Hockett | ............. | A47J 37/1214 426/438 |
| 2019/0191926 A1 * | 6/2019 | Guerrero | ............. | A47J 37/044 |
| 2019/0290063 A1 * | 9/2019 | Shei | ............. | A47J 37/045 |
| 2020/0154927 A1 * | 5/2020 | Mu | ............. | A47J 36/2405 |
| 2021/0127898 A1 * | 5/2021 | Sammon | ............. | A47J 36/32 |
| 2021/0298526 A1 * | 9/2021 | Lyons | ............. | A47J 36/32 |
| 2021/0321823 A1 * | 10/2021 | Kalling | ............. | A23L 19/18 |

* cited by examiner

Primary Examiner — Steven W Crabb
Assistant Examiner — Keith Brian Assante
(74) Attorney, Agent, or Firm — Nolte Lackenbach Siegel; Andrew F. Young, Esq.

(57) ABSTRACT

A cooking system, including a product loader for dispensing uncooked food product; a broiler/oven having an inlet end, a cooking chamber, a discharge end, a motorized conveyor system for conveying food through said broiler from said inlet end to said discharge end, and heating elements for heating and cooking food products in said cooking chamber. Disposed at the input end between product feed belts and broiler conveyor belts is a photoelectric sensor system that detects the presence of food product passing from the feed belts to the broiler conveyor belts which, when tripped, locks in the cook time for a recipe under execution and prevents inadvertent user changes that would adversely affect the cooked product quality.

15 Claims, 9 Drawing Sheets

AUTOMATED BROILER WITH PRODUCT SENSOR SYSTEM

CROSS-REFERENCE TO RELATED APPLICATIONS

Not applicable. The present application is an original and first-filed United States Utility Patent Application.

TECHNICAL FIELD

The present invention relates generally to commercial broiler systems for the rapid cooking of food products, and more particularly to an automated broiler system having a sensor system that detects when food product of a particular kind is loaded into a broiler/oven for cooking, which sends a signal to a control system that is governed by a unique system logic.

BACKGROUND DISCUSSION

To prepare certain foods, such as hamburger patties, sausages, hot dogs, and chicken and fish fillets, and the like, as well as their respective buns, high output commercial food purveyors (i.e., fast food restaurants) utilize conveyor broiler systems that rapidly and continually cook the food products. The systems typically comprise a housing having a horizontal conveyor for moving food product from an input end to an output end. During the cooking process the food passes between a number of heating elements, typically either electric resistance elements or gas burners.

As may be readily appreciated, the profitability of utilizing such a system hinges on a number of factors, including, among other things, the rapidity and efficiency with which the food product can be cooked, the minimization of energy and/or fuel utilized in cooking, the ease with which the system can be serviced and cleaned, and most pertinently to the present invention, the quality (and therefore desirability) of the cooked food products.

The procedure for operating a conveyor broiler in a commercial fast food or quick service restaurant typically involves a user placing uncooked product on a feed belt, which is typically implemented either as a push bar or as a wire belt system. The feed belt transfers the food product to the cook belt operating within a cooking chamber. The cook belt runs at a speed according to a product recipe. Once the product has traveled the full length of the cook chamber on the cook belt, it is discharged into a holding pan that can be placed in a product holding unit (PHU).

While the product is cooking in the cook chamber, if the user changes the cook belt speed (product recipe), then the product currently being cooked on that cook belt would either be under-cooked or over-cooked owing only to the change in the time the product spends in the cook chamber.

When properly operated by trained operators, the conveyor broiler provides consistent results in the finished product. The occasional inconsistency of finished product, either under-cooked or over-cooked usually results from human error—i.e., either from a lack of training or a lack of attention. This inconsistency is promoted by the inherent structure of the enclosed cooking chamber and the consequent inability of an operator to easily and quickly observe whether the cooking belt has finished conveying the product through the broiler. As it stands, there is no failsafe that prevents an operator from prematurely changing a recipe controlling the operation of a particular cook belt. The current solution to the problem is dependent on the memory and vigilance of the operator. That is to say, the operator must visually look into the cooking chamber to see if the cook belt is clear of product before changing a recipe. As will be appreciated, in many instances an operator will need to leave one station (for instance, a sales register) to visually check on product cooking status and whether PHU pans are full. Every time an employee must leave a station to check on product cooking status, it cuts into the time they have to provide services at the abandoned station. This results in productivity and monetary loss.

If for some reason the product is forgotten after its discharge from the cooking chamber and then allowed to sit too long in a product holding unit (PHU) pan, the quality of the product degrades. To prevent the product from drying out or cooling off, operators must remember to periodically check the PHU to see whether it is full and/or if the broiler is done cooking.

At the end of the day, site managers have no easy way to account for wasted product from problems or inefficiencies or operator error during operation. Currently, restaurants occasionally provide a bucket near the broiler designated as a "bad product" trash bin. At the end of the day, the manager may sort through the trash bin and count waste products. By its very nature, the bin contains bad product, including raw meat, which can sit for several hours to create unsanitary conditions.

Several rapid cooking broiler systems have been developed for use in the fast food industry, including those described in the following U.S. patents.

U.S. Pat. No. 8,076,614, to Baker et al, the teachings of which are incorporated in their entirety by reference herein, discloses a cooking system for cooking foods using a combination of magnetic induction, convection and radiant heat, including a magnetic induction stage proximate the inlet end of a cooking chamber in which food is cooked by convention and radiant heating. A conveyor system, either continuous or configured in stages, passes food from the magnetic induction heating stage to and through the radiant and convection heating stages.

U.S. Pat. Appl. Pub. No. 2017/0095112, also by Baker et al., describes a cooking system, including a product loader for dispensing uncooked food product, a broiler/oven having an inlet end, a cooking chamber, a discharge end, a motorized conveyor system for conveying food through the broiler from the inlet end to the discharge end, and heating elements for heating and cooking food products in the cooking chamber. Disposed proximate the discharge end is a temperature sensor system including temperature sensors for measuring the internal temperature of the cooked food product. Readings from the temperature sensor system are sent to a system controller to evaluate and qualify food product as sufficient or insufficiently cooked. A discharge control system sends disqualified food product to a discard bin and qualified food product to a product holding bin (PHU). This published application and its teachings are likewise incorporated in its entirety by reference herein.

However, these patents, as well as those of other and all other known prior art, fail to disclose, teach, suggest, show, or otherwise render obvious, either singly or when considered in combination, the invention described and claimed herein. In particular, none teach: (1) a commercial conveyor broiler system capable of sensing when food product of a particular kind has been entered into the cooking chamber to lock in a cooking time and temperature; (2) a conveyor broiler having a signaling system to alert operators when a cooking cycle is completed; or (3) a commercial conveyor broiler having a log system that tracks the number and volume of daily product fed into the broiler that enables a manager to compare sales to product fed into the broiler to calculate daily product waste.

BRIEF SUMMARY OF THE INVENTION

The present invention provides more accurate information to the operator, whether or not there is food product cooking in the chamber, so that mistakes primarily related to overcooking and undercooking can be avoided.

In a first aspect, the present invention is an oven/broiler disposed between either a manual product input end or an automated uncooked product dispenser at its product input end and a cooked product dispenser at an output end. The conveyor operates at either a predetermined set (default) speed or at a speed modified by the user through a user interface or under an automated control system according to recipe specifications. The system includes a conveyor system including chain conveyors moving under and/or over heating elements or burners that cook the food for a predetermined time, again according to the product recipes.

Embodiments of the system include a controller with logic to manage all of the operations.

The broiler is equipped with two photodetectors or photosensors. The sensors are configured to scan horizontally across the space between a feed belt and the input end of a cook belt and are wired to a cook lane motor board. When the photodetector is tripped/activated/triggered, the broiler controller registers the presence of a product passing from the product feed system and has entered the cooking chamber on a particular cooking belt. The photosensor input is coupled by the microprocessor to the corresponding motor driving the cook belt through the motor board. The input is used by the controller to start a timer to set and lock in a predetermined cooking time for that particular product to be considered finished cooking. The timer is configured to alert the operator using a perceptible output (e.g., a buzzer, light, or both) after the product has traveled the full cook chamber length and is discharged to the product holding unit pan. However, while the product is cooking, if there is any need to introduce a recipe change (and thus cooking time), the operator will be given a visual prompt on the user interface seeking a confirmation that the user is certain he or she wants to change the recipe, and only a deliberate manual override can change the recipe (cooking time) locked in by the controller.

The present invention includes an alarm, such as an audible output or a light, or both, that signal the operator and indicate that the broiler is done cooking. This signal is produced when the timer reaches zero. This signals the operator to check the pans for finished products and thereby decreases a product's wait-and-sit time. This should also reduce the wasted time taken to continuously check if the broiler is done cooking.

In addition to a signaling system that alerts an operator to check the PHUs, since a signal is output each time product is added to the cooking chamber, a log is created in the controller that tracks and calculates daily totals of product fed into the broiler. The log includes time stamps and dates for export into a database having calculation and graphing tools for use by a manager or restaurant owner to evaluate problems relating to product waste. At the end of the day, instead of having to count unsanitary products from the day, a manager can compare sales to product fed through broiler to determine the degree of waste over a given time period.

It will be appreciated, therefore, that in embodiments, the present invention uses sensors to detect product loading at the input end of the broiler. Users still place uncooked product on a feed belt, and the feed belt transfers the food product to the cook belt operating within a cooking chamber. But unlike conventional broilers, the inventive system automatically detects product moving from the feed belt to the cook belt and locks the system operation into the specification for the particular product recipe, thereby preventing the user from altering the cook belt speed. In response to the detected food product entering the cooking chamber, the system controller starts a timer based on cook belt speed. During timer activation, the cook recipe cannot be changed without overriding an additional safety prompt and deliberate conscious action from the user. Once the timer deactivates, notification of the finished cooked product is displayed. If more product is loaded onto the cook belt, timer activation is reset, and the cycle begins anew.

In embodiments, the timer trip is a signal from the photodetectors to the conveyor motor board specific to a cook lane motor.

In embodiments, the timer trip is on a delay, e.g., a 5-second delay. This helps prevent false readings from users.

In embodiments the photodetector is a photoelectric sensor using an infrared or laser light transmitter and photoelectric receiver. The light emitter and light detector are consolidated, and when the leading edge of the food product reflects some or all of a light beam from the transmitter back to the receiver, it trips the sensor to trigger a signal output until product is fully loaded. From the initial sensor trip to the end of timer activation, the recipe is effectively "locked out" from inadvertent changes.

In embodiments, the photoelectric sensors are infrared or red light diffuse reflection sensors (or proximity mode sensors) with tightly sealed potentiometers. Such systems have advantages when working in smoky, steamy, and highly reflective environments, as well as in greasy cooking environments.

In embodiments, the cooking chamber may include a single cook belt loaded with food product by a corresponding single feed belt. In such embodiments, the photoelectric sensor system may be disposed in the transition zone between the feed belt and the cook belt and configured to send a beam of light across the transition zone. This may be accomplished using a through-beam system, a retroreflective system, or a proximity-sensing system.

In embodiments, the cooking chamber may be divided into distinct cook lanes, each programmable and having adjustable and possibly different conveyor belt speeds. In such embodiments, the feed belts are also discrete and have a dedicated photosensor for each lane, again configured as any of the three types identified in the immediately preceding paragraph, though retroreflective and diffuse reflection (proximity-sensing) systems are better suited to such cooking lane/feed lane arrangements. In embodiments incorporating a diffuse reflection system, the transition zone between the feed belt and cook belt may be divided between each of the respective feed belts and cook belts lanes by a specular reflector in the case of a retroreflective system and a non-reflective divider in the case of a diffuse reflection system.

In embodiments, the timer duration commences at the falling edge of the trip signal, and the duration is the cook time plus a predetermined drop factor, such as 15 seconds.

Other novel features characteristic of the invention, as to organization and method of operation, together with further objects and advantages thereof will be better understood from the following description considered in connection with the accompanying drawing, in which preferred embodiments of the invention are illustrated by way of example. It is to be expressly understood, however, that the drawing is for illustration and description only and is not intended as a definition of the limits of the invention. The various features of novelty which characterize the invention are pointed out with particularity in the claims annexed to and forming part of this disclosure. The invention resides not in any one of these features taken alone, but rather in the particular combination of all of its structures for the functions specified.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
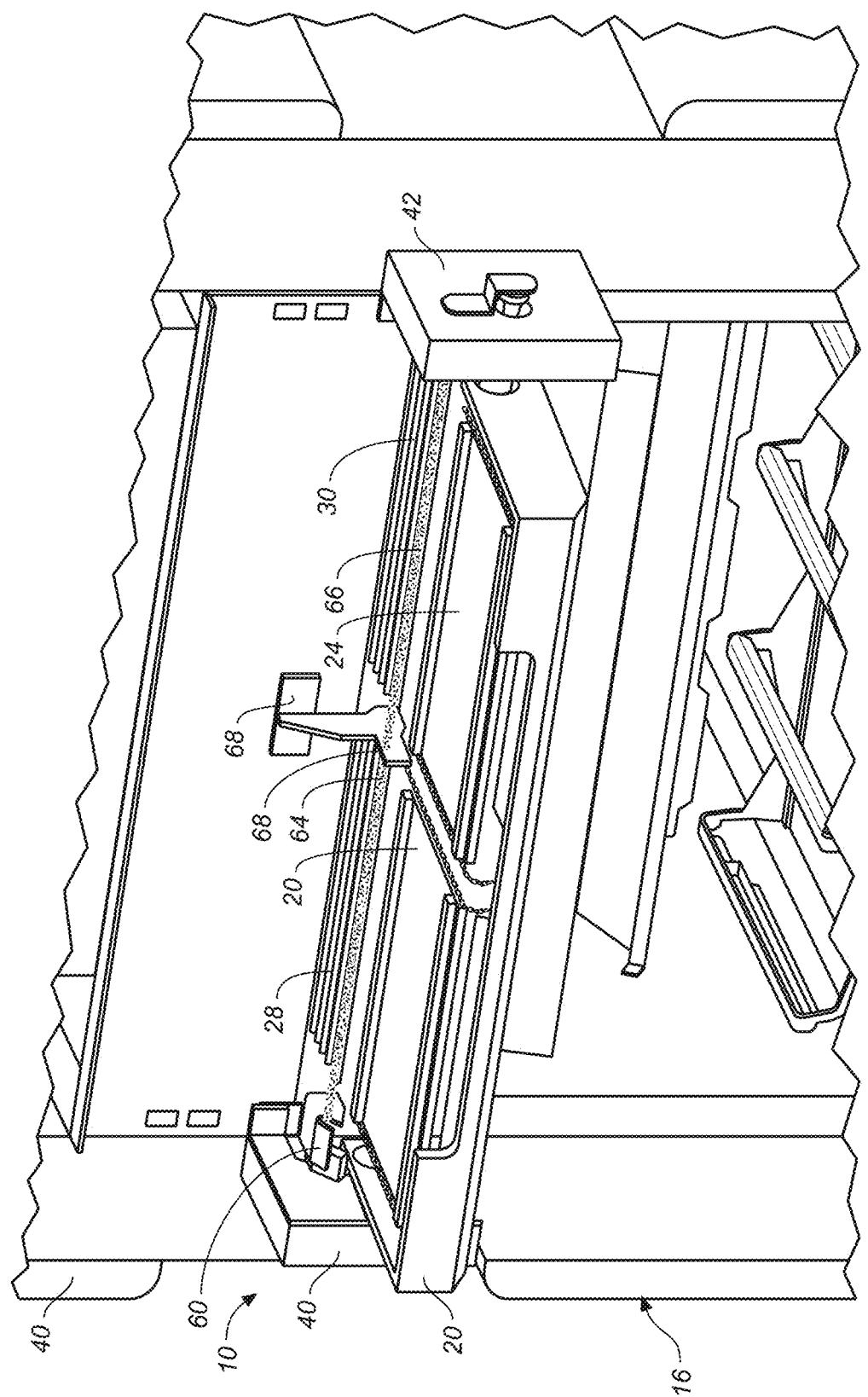
FIG. 1 is an upper front right perspective view showing the inventive broiler system having a product sensor system installed at the input end of the broiler.
Figure 2:
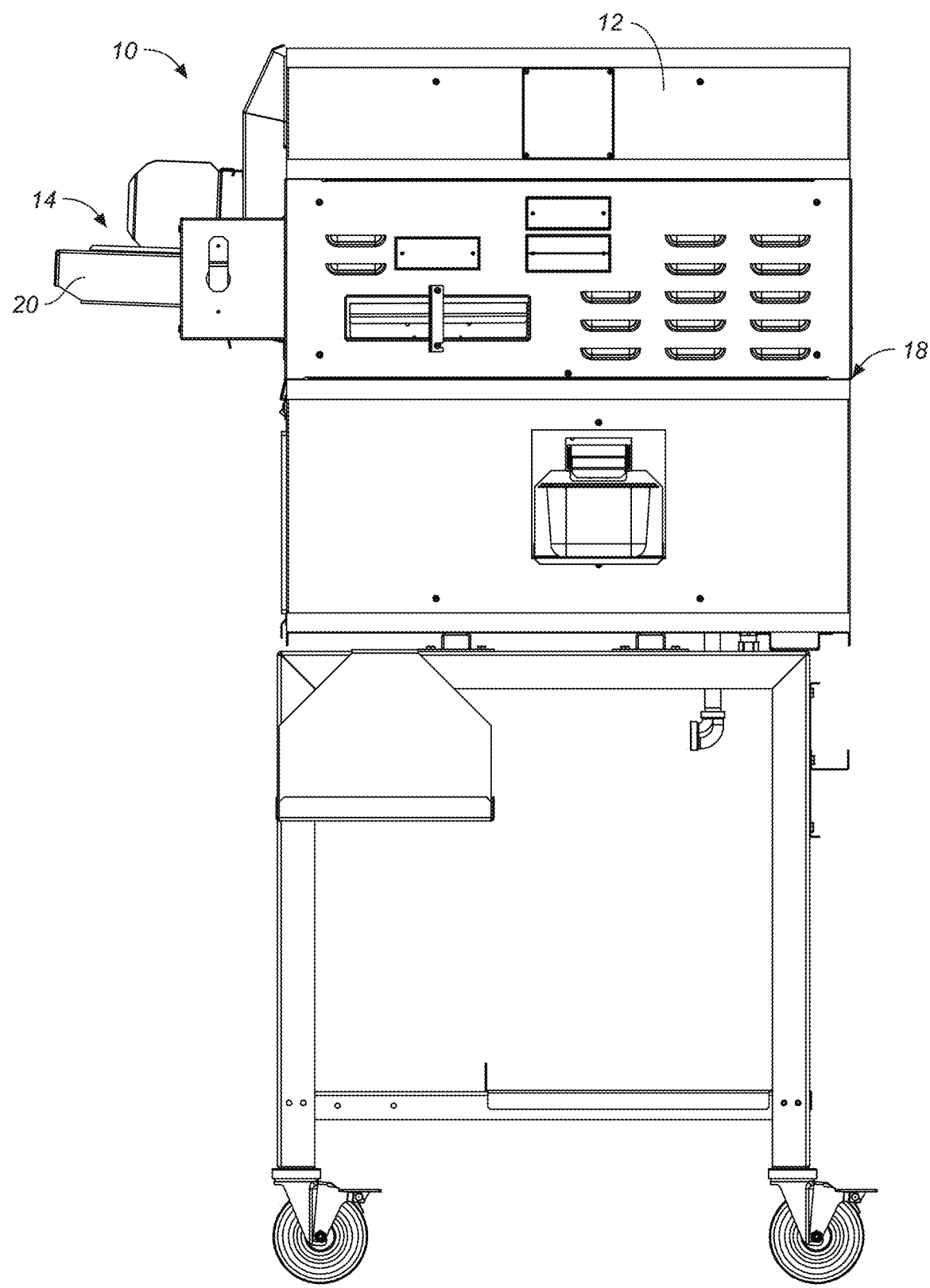
FIG. 2 is a side view in elevation thereof, shown mounted on a commercial kitchen utility table with locking casters.
Figure 3:
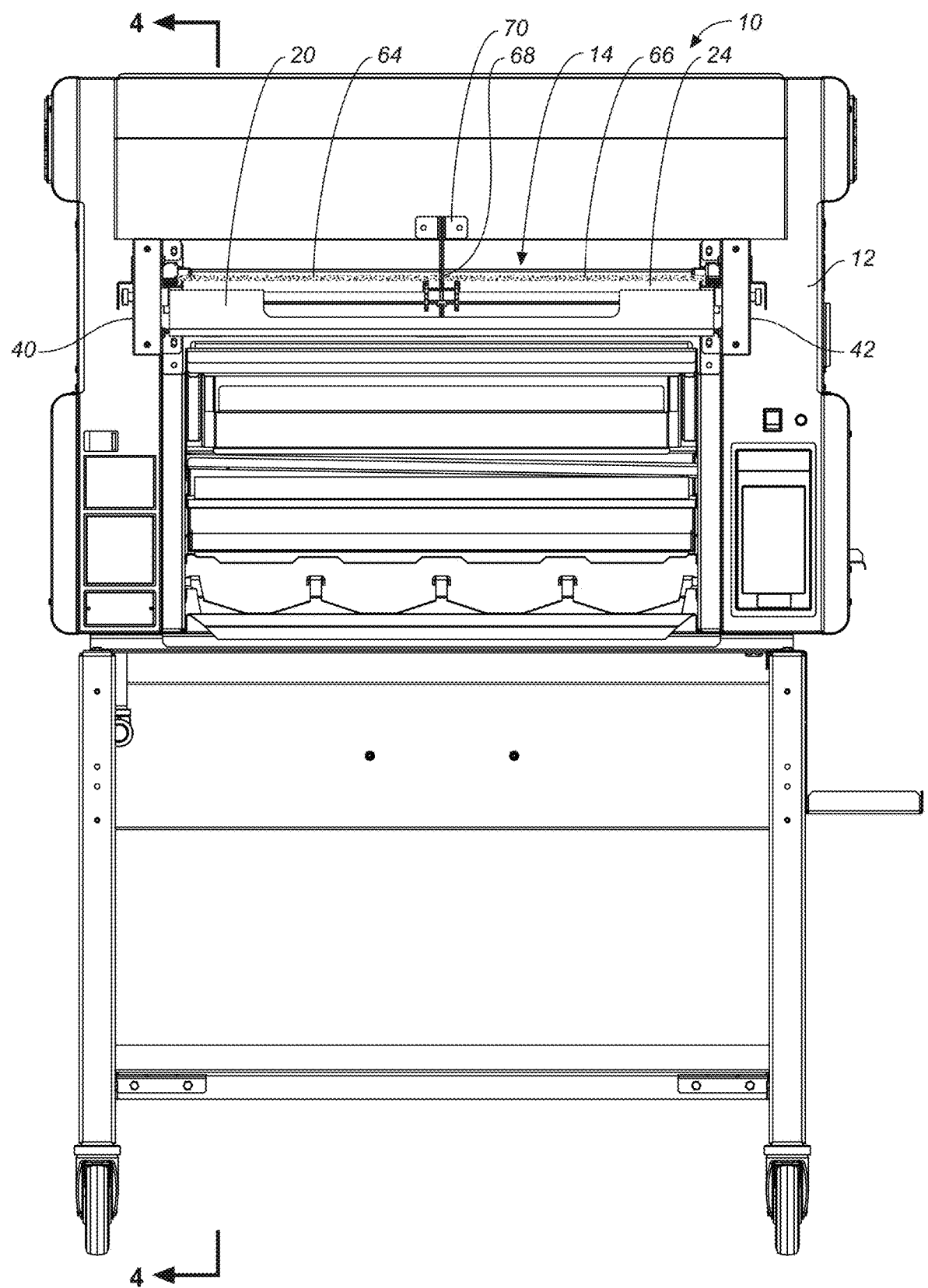
FIG. 3 is a front view in elevation thereof.
Figure 4:
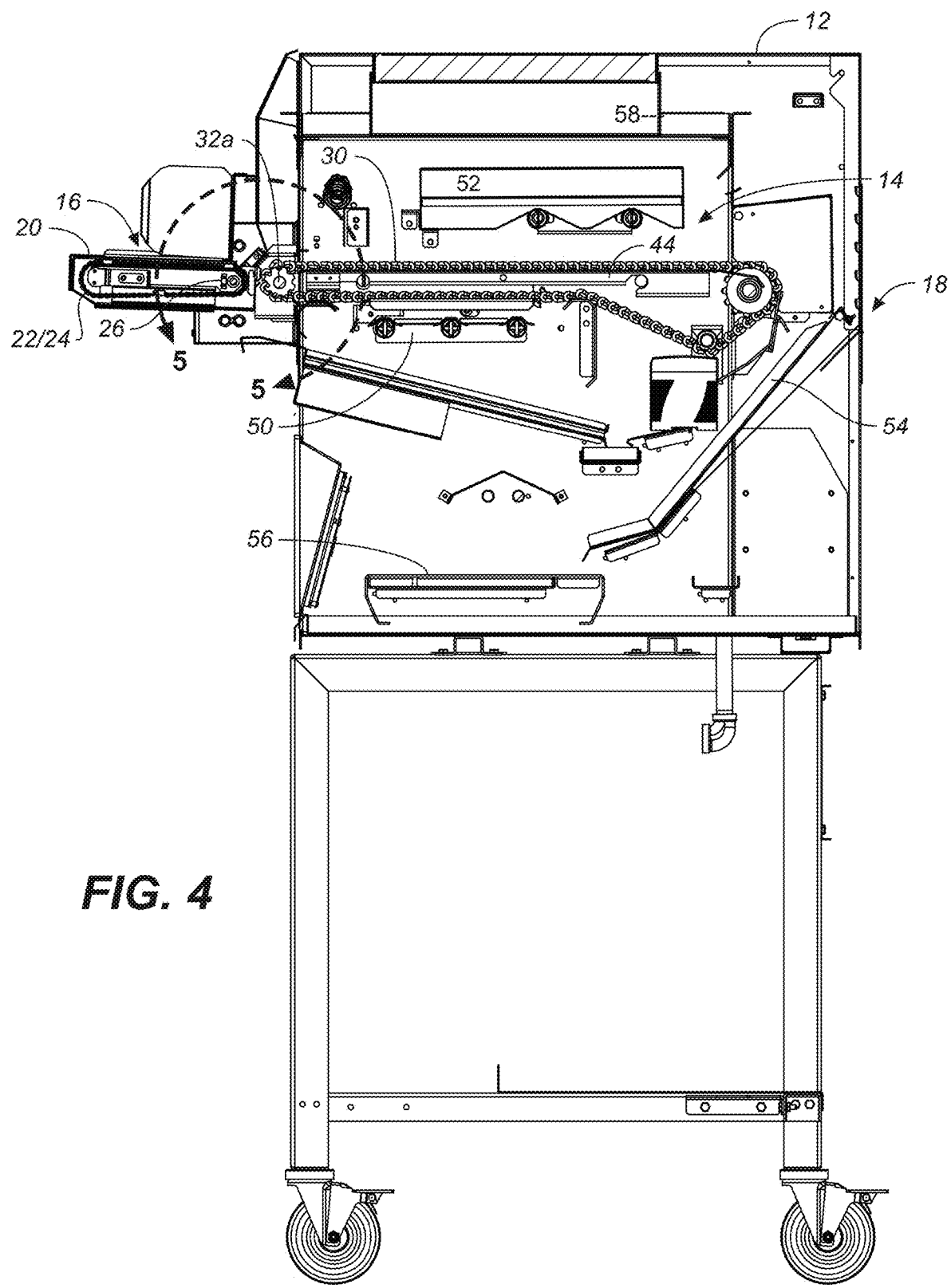
FIG. 4 is a cross-sectional side view in elevation thereof taken along section line 4-4 of FIG. 3 and featuring the operational elements of the broiler.
Figure 5:
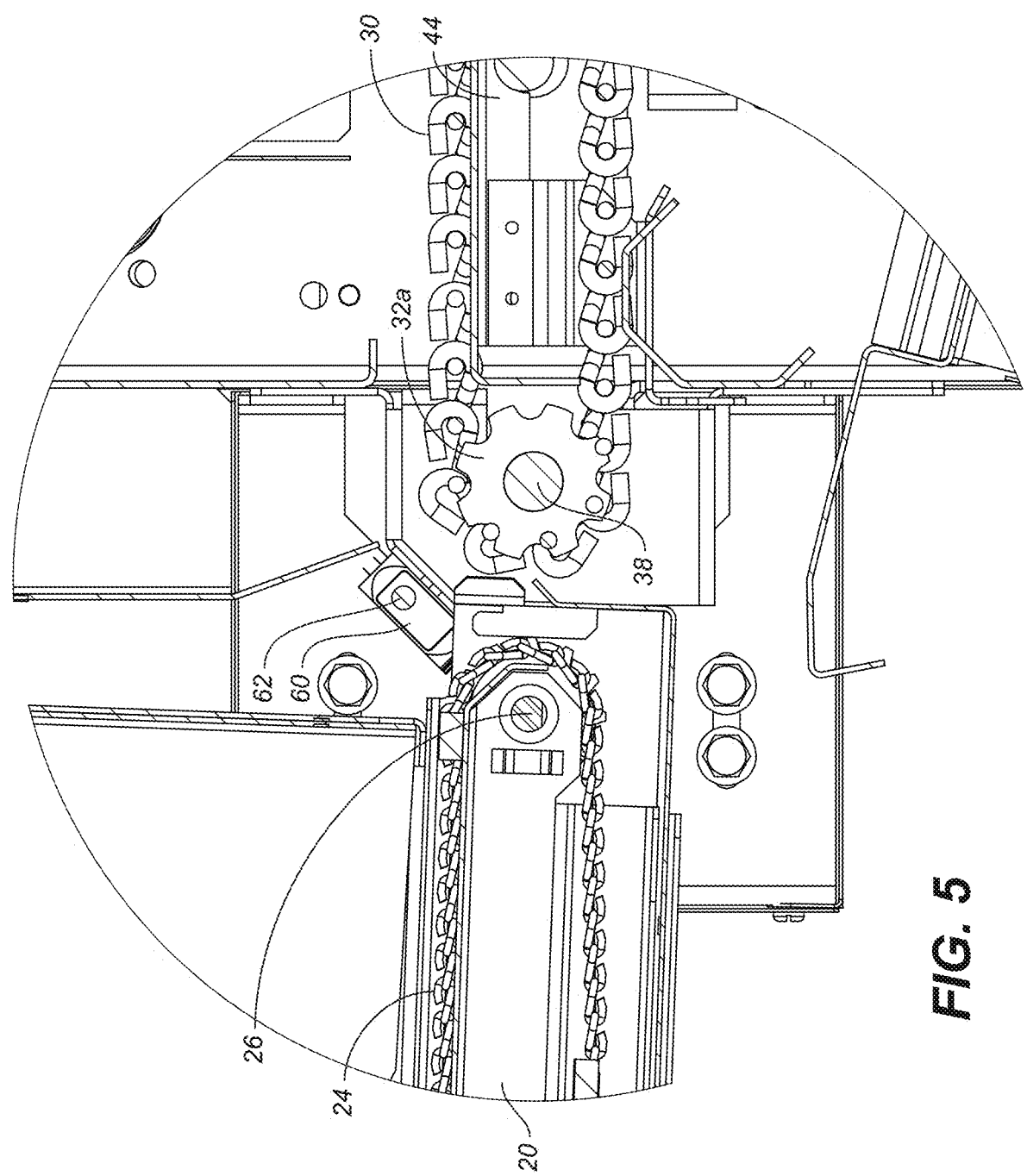
FIG. 5 is a detailed cross-sectional side view in elevation taken along section lines 5-5 of FIG. 4.

Referring to FIGS. 1 through 9 wherein like reference numbers refer to like components in the various views, there is illustrated an automated commercial broiler having a product sensor system, the entire system generally denominated 10 herein.

FIGS. 1-5 show the broiler system 10 employed in the present invention. Typical of such conveyor broilers, the broiler/oven includes a housing 12 defining a cooking chamber 14 with a product input side 16 and product discharge side 18. Alternative configurations to achieve the same functional ends are contemplated in the description herein and fall within the scope of the invention. For instance, the broiler/oven could be configured with coincident input and discharge ends, which may be accomplished through simple modifications of the product conveyor system or discharge chutes.

A user may place product P1, P2, onto the input side of the broiler—or, alternatively, an automated uncooked product dispenser may dispense and direct product—onto the loading platform 20, where it is placed onto the loading platform wire conveyor belts (feed belts) 22, 24 in each of the belt lanes, two being shown in the views, each driven by one or more drive shafts 26.

After being passed from the conveyors of the loading platform into the motorized cooking conveyor belts (cook belts) 28, 30, each unit of food product is driven on the moving cook belts by motorized drive gears 32a, 32b, 34a, 34b, on axles 36, 38 operatively coupled at their outboard ends, respectively 36a, 38a, to motors housed in housings 40, 42, disposed on each side of the loading platform 20 and the conveyor belt platform 44. The cook belt drive axles may be journaled at their inboard ends 36b, 38b, respectively, in a medial bushing which allows them to move independently of one another. Motors 46, 48 for the feed belts 22, 24 are also housed in the motor housings.

Once in the conveyor broiler, the food product is rapidly cooked in a highly efficient convection/radiant heating chamber, by lower and upper burner arrays, 50, 52, respectively, after which it is discharged at the discharge end 18 of the broiler and directed by a discharge ramp 54 to a product holding unit bin 56. Cooking efficiency may be enhanced by the use of a low pressure compressed air system that provides air to an air plenum 58 disposed above the upper gas burner elements, each having parallel arrays of air outlet ports that straddle the gas burner elements and create a curtain of forced air that drives heat and flame downwardly and toward the moving food product.

The time that the product remains in the cooking chamber is determined by the speed with which it is conveyed from the input end to the discharge end, and the cook belt speed is, in turn, predetermined according to cooking recipes for particular products, which may be dedicated to one or the other of the cooking lanes in the broiler. The cook belt speed is under control of the system controller, wherein user input may identify product type and thus direct the controller to set the time and temperature of the cooking cycle.

Figure 6:
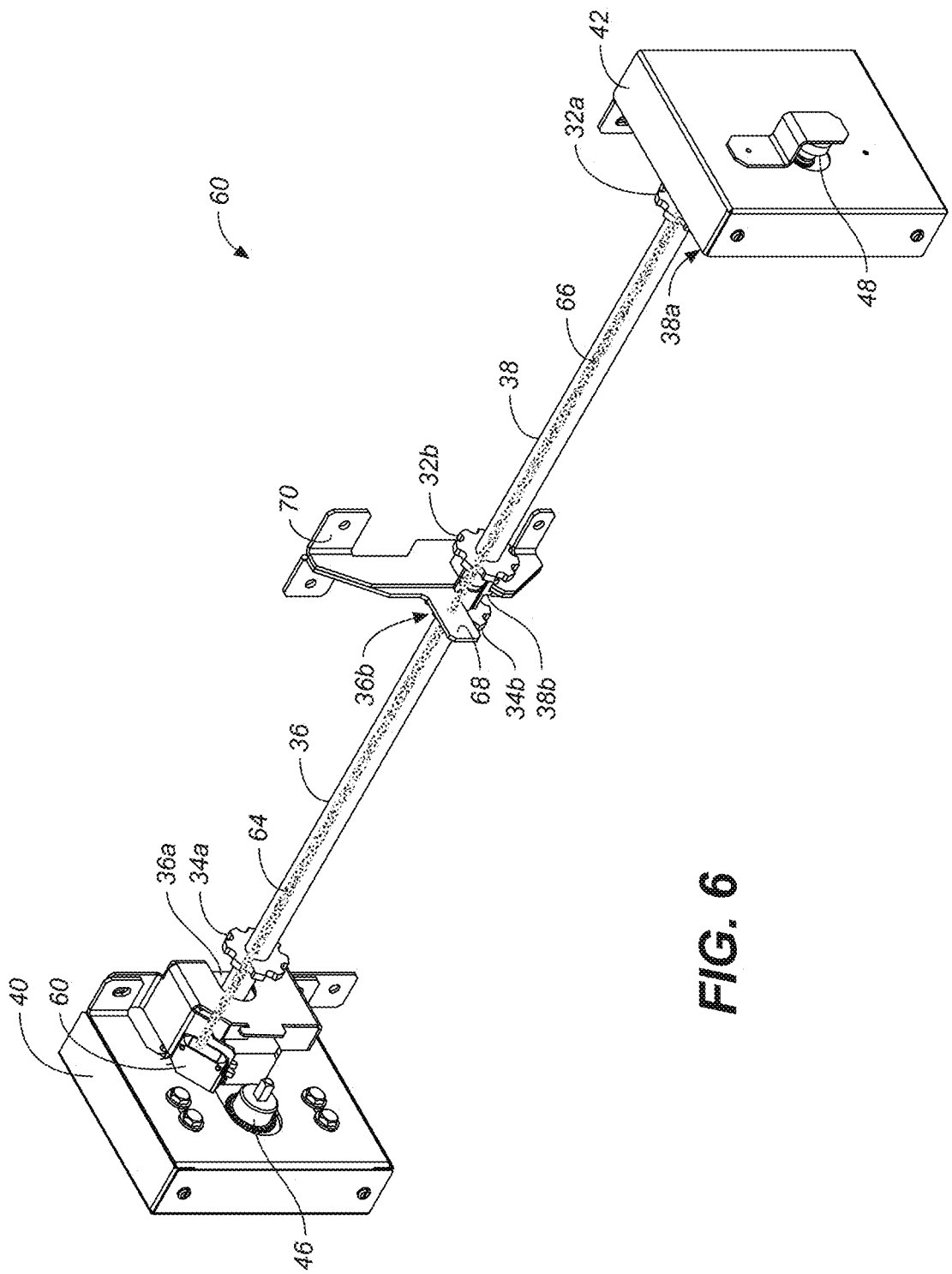
FIG. 6 is an upper front right perspective view of the photoelectric product sensor system configured for use in the present invention.
Figure 7:
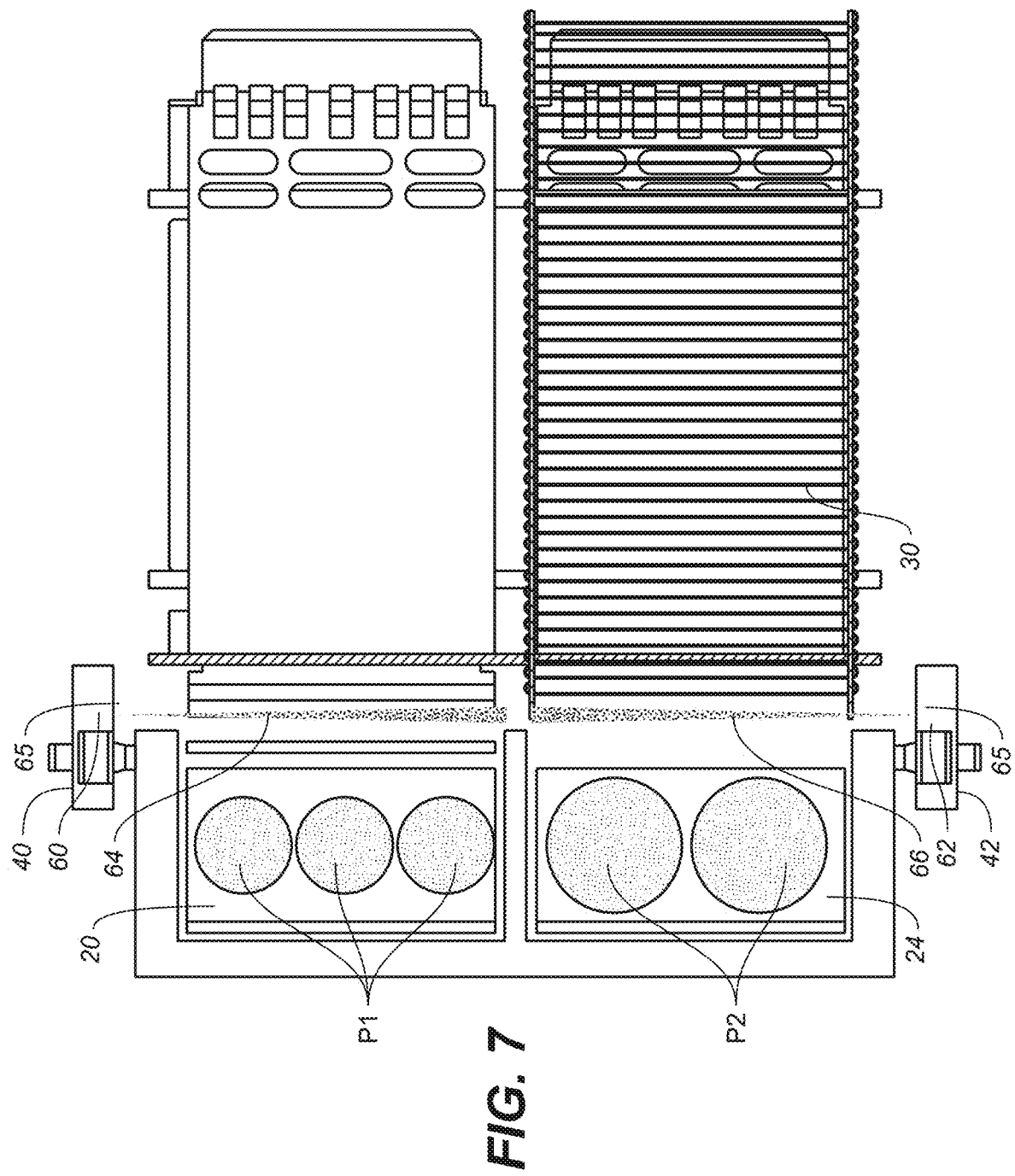
FIG. 7 is a schematic top plan view showing the operational zones for a broiler with two conveyor lanes.

Referring now to FIG. 6, most pertinently for the present invention, the broiler system includes one or more photoelectric sensor systems 60, 62, co-located on each of the drive motor housings between and at the sides of the loading platform and the cook belt platform. In embodiments, the inventive system uses diffuse mode (proximity-sensing) photoelectric sensors, wherein each shines a light 64, 66, through a lens (64 only showing), at or slightly above the upper plane of at least the conveyors of the cook belts and across this transition zone 65. The beams may also be at or slightly above the upper plane of the feed belts, unless the product loading plane is slightly above that of the cook belts. The beams from each photoelectric sensor system are each completely intercepted and prevented from interfering with one another by a medial beam barrier 68 integral with a bracket 70 affixed to the broiler housing with its barrier plate depending downwardly from the housing into the transition zone; alternatively it may be affixed to the loading platform between the feed belts and extend forwardly and into the transition zone. The medial beam barrier may be specular, if a retroreflective sensor system is employed, or nonspecular, if a diffuse mode sensor system is employed.

Figure 8:
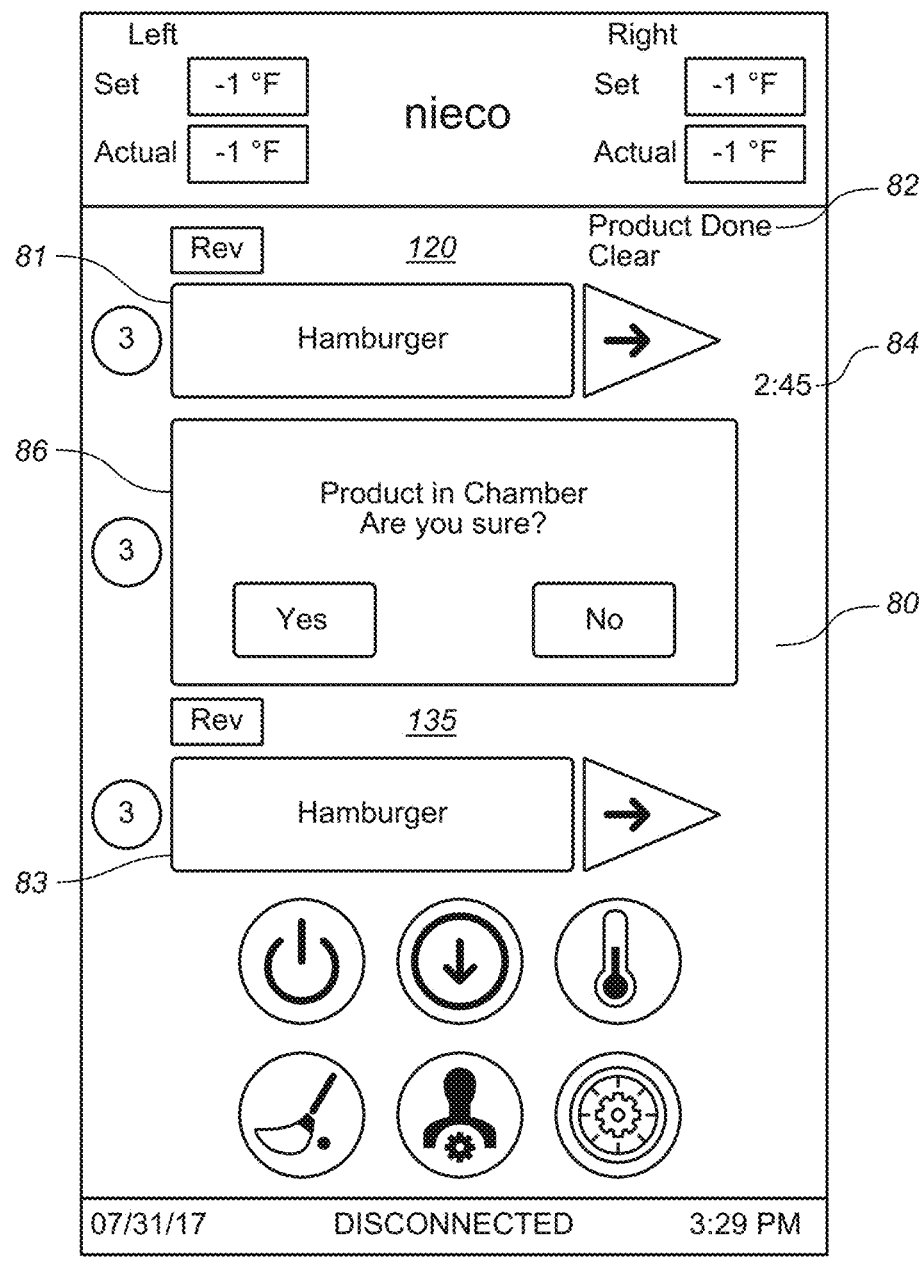
FIG. 8 is a schematic view showing a user interface for a recipe change prompt when product is in the broiler.

When food product traverses the gap in the transition zone between the feed belts and the cook belts, the front edge of the product reflects part of the beam back to the sensor, thereby causing the sensor to detect the product. Once the product is detected, a signal is sent to the motor board, which in turn forwards the signal to the main board, which outputs a signal to the user interface on the system controller. An exemplary user interface 80 is shown in FIG. 8. This particular schematic screen shot shows the UI prompt when a user seeks to change a recipe while product is still cooking in the cooking chamber. As can be seen, the UI includes an indication of product type 81 for lane 1 of the broiler, as well as an indication that the product is finished cooking (is done) 82 and has been discharged ("Clear") from the conveyor belt into the PHU pan. The UI also includes an indication 83 of product type for lane 2, a cooking timer 84, and a recipe change prompt 86, which is displayed because the user has initiated a recipe change. Note that the user must deliberately and consciously elect a No or Yes to remove the prompt.

Figure 9:
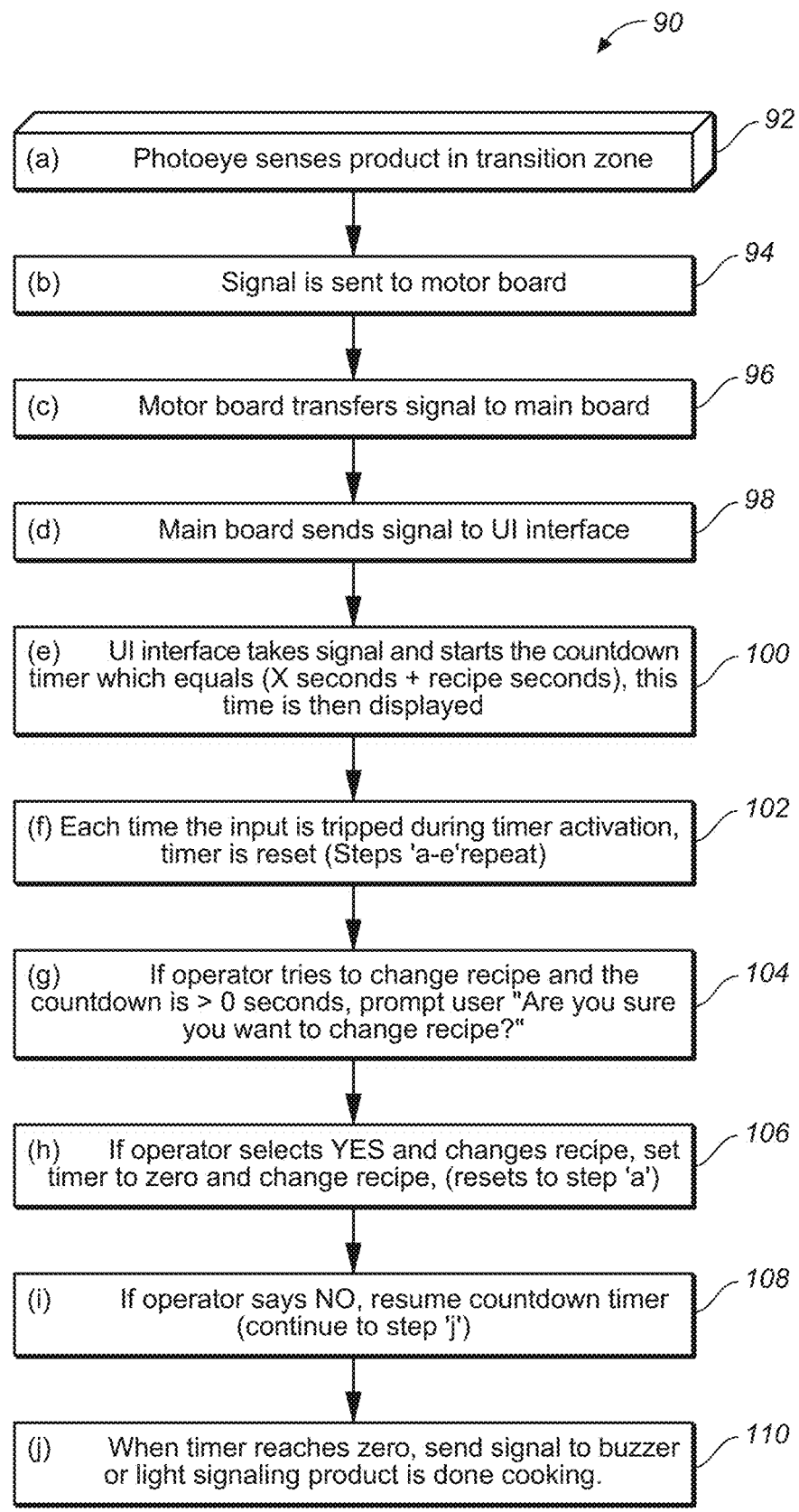
FIG. 9 is a block diagram showing system logic when product presence is sensed by the product sensors.

A flow chart 90 showing system logic is shown in FIG. 9. At box 92, the photoelectric sensor has detected product traversing the transition zone from the product loading platform to the broiler conveyor. The sensor sends a signal to the motor board 94, which transfers the signal to the main board 96. The main board, in turn, sends a "product sensed" signal to the user interface 98, and the user interface controller starts the countdown timer which equals the recipe time plus some predetermined and preprogrammed additional number of seconds 100. Each time the sensor system detects product passing from a feed belt to a cook belt, the system is "tripped" and the timer is reset, such that steps at boxes 94-100 repeat 102.

If during the cook operation the user attempts to change the recipe (i.e., broiler operation), and if the timer countdown is greater than zero seconds, the user interface prompts the user with a prompt reading: "Are you sure you want to change the recipe?" 104 This invites a deliberate and conscious cancellation of the action initiated, or, alternatively, a manual override of the recipe then being executed 106. If the operator selects YES and does, in fact, change the recipe, the timer sets to zero and the recipe is changed, and the process resumes at step (a) box 92. If the operator responds by pressing NO, the countdown timer simply resumes 108 and the process continues to the next step, which allows the timer to run down to zero, at which point it sends a signal to output an alarm of some kind to indicate to the user that cooking is completed 110.

In whatever way the UI display is specifically configured and whatever the particular content of the user prompt may be, in an essential aspect the system prevents the user from carelessly making changes to cook belt speed or cook temperature by requiring that the user apprehend and appreciate when food product is cooking. Changes can be made only through deliberate responses to informative cues to override default cooking parameters.

Thus, it will be appreciated that in its most essential aspect, the broiler system of the present invention includes a food product loading platform having a loading platform with at least one motorized feed belt for conveying uncooked food product to and into a broiler; a broiler or an oven or a combination thereof, including an inlet end with a food product inlet through which uncooked food product is received from the feed belts, the broiler/oven including a cooking chamber, a discharge end having a food product outlet for discharging cooked food product, at least one motorized cook belt for conveying food through the broiler from the inlet end to the discharge end, and heating elements for heating and cooking food products in the cooking chamber, wherein the at least one feed belt is spaced apart from the at least one cook belt to define a transition zone; a cook controller operatively coupled to the broiler/oven and controlling cooking parameters, including temperature and cooking time, the cook controller having a user interface; and a photoelectric sensor system having operative elements disposed at the sides of the transition zone, the operative elements including a light emitter positioned and configured to emit a beam of light laterally across all or a portion of the transition zone at or slightly above an upper level of the at least one feed belt and the at least one cook belt on which food product is transported, and a light receiver positioned at the same level, the light receiver positioned and configured such that food product passing through the transition zone reflects a portion of the light beam back to the receiver, and when the light receiver receives reflected light from food product passing through the beam of light emitted by the light emitter, the photoelectric sensor system sends a signal to the cook controller to start a timer and lock in the recipe for the product being cooked, wherein when a user attempts to change a recipe during cooking, the controller displays a prompt through the user interface requiring the user to confirm his or her wish to change the recipe.

The above-described system effectively and entirely prevents inadvertent recipe changes during the cooking of any product, and thus prevents product being over-cooked or undercooked due to inadvertent changes in the predetermined cook time.

The foregoing disclosure is sufficient to enable those with skill in the relevant art to practice the invention without undue experimentation. The disclosure further provides the best mode of practicing the invention now contemplated by the inventor.

While embodiments of the automated broiler and method herein shown and disclosed in detail are fully capable of attaining the objects and providing the advantages stated herein, it is to be understood that the embodiments are merely illustrative of the presently preferred embodiments of the invention and that no limitations are intended as to the detail of construction or design herein shown other than as defined in the appended claims. Accordingly, the proper scope of the present invention should be determined only by the broadest interpretation of the appended claims so as to encompass all such modifications as well as all relationships equivalent to those illustrated in the drawings and described in the specification.

What is claimed as invention is:

1. A food product conveyor broiler or oven, comprising:
  a food product loading platform having a loading platform with at least one motorized feed belt for conveying uncooked food product to and into a broiler;
  a broiler or an oven or a combination thereof, including an inlet end with a food product inlet through which uncooked food product is received from said at least one feed belt, said broiler/oven including a cooking chamber, a discharge end having a food product outlet for discharging cooked food product, at least one motorized cook belt for conveying food through said broiler from said inlet end to said discharge end, and heating elements for heating and cooking food products in said cooking chamber, wherein said at least one feed belt is spaced apart from said at least one cook belt to define a transition zone;
  a cook controller operatively coupled to said broiler/oven and controlling cooking parameters, including temperature and cooking time, said cook controller having a user interface;
  at least one photoelectric sensor system electrically connected to said cook controller and having operative elements disposed at the sides of said transition zone, said operative elements including a light emitter positioned and configured to emit a beam of light laterally across all or a portion of said transition zone at or above an upper plane of said at least one cook belt on which food product is transported, and a light receiver positioned at the same level, said light receiver positioned and configured such that said photoelectric sensor system detects food product passing through the transition zone;

said broiler includes first and second feed belts paired with respective first and second cook belts;

wherein each of said first and second cook belts is under separate control by said cook controller, such that each of said cook belts may move at different speeds through said cooking chamber; and including first and second photoelectric sensor systems for each pair of feed belts and cook belts.

2. The food product conveyor broiler or oven of claim 1, wherein said light emitter and said light receiver are co-located.

3. The food product conveyor broiler or oven of claim 2, wherein said photoelectric sensor system is a diffuse mode sensor, such that portions of the beam of light emitted by said light emitter are reflected off food product passing through said transition zone, and when said light receiver receives such reflected light, said photoelectric sensor system sends a signal to said cook controller to start a timer and lock in the recipe for the product being cooked.

4. The food product conveyor broiler or oven of claim 3, wherein when a user attempts to change a recipe during cooking, said controller displays a prompt through said user interface requiring the user to confirm his or her wish to change the recipe.

5. The food product conveyor broiler or oven of claim 1, further including a medial beam barrier disposed in said transition zone between first and second feed belts and said first and second cook belts, wherein said medial beam barrier intercepts beams emitted by said light emitters in each of said photoelectric sensor systems.

6. The food product conveyor broiler or oven of claim 5, wherein said medial beam barrier is nonspecular.

7. The food product conveyor broiler or oven of claim 6, wherein said first and second photoelectric sensor systems are diffuse mode sensors.

8. A food product conveyor broiler or oven, comprising:

a food product loading platform having a loading platform with at least one motorized feed belt for conveying uncooked food product to and into a broiler;

a broiler or an oven or a combination thereof, including an inlet end with a food product inlet through which uncooked food product is received from said at least one feed belt, said broiler/oven including a cooking chamber, a discharge end having a food product outlet for discharging cooked food product, at least one motorized cook belt for conveying food through said broiler from said inlet end to said discharge end, and heating elements for heating and cooking food products in said cooking chamber, wherein said at least one feed belt is spaced apart from said at least one cook belt to define a transition zone;

a cook controller operatively coupled to said broiler/oven and controlling cooking parameters, including temperature and cooking time, said cook controller having a user interface;

at least one photoelectric sensor system electrically connected to said cook controller and having operative elements disposed at the sides of said transition zone, said operative elements including a light emitter positioned and configured to emit a beam of light laterally across all or a portion of said transition zone at or above an upper plane of said at least one cook belt on which food product is transported, and a light receiver positioned at the same level, said light receiver positioned and configured such that said photoelectric sensor system detects food product passing through the transition zone; and wherein, said, cook controller is configured to lock in a product recipe when product is detected by said photoelectric sensor system, and wherein said cook controller outputs at least one alert through said user interface requiring that a user respond to and override said at least one alert with inputs through said user interface.

9. The food product conveyor broiler or oven of claim 8, wherein said at least one alert is a prompt in the form of an inquiry to a user seeking confirmation that the user wishes to change the recipe then being implemented.

10. The food product conveyor broiler or oven of claim 9, wherein said photoelectric sensor system and said cook controller are configured such that each time product is sensed by said photoelectric sensor system, said cook controller starts a countdown timer which equals the recipe time plus a predetermined additional number of seconds.

11. The food product conveyor broiler or oven of claim 10, wherein each time said photoelectric sensor system detects food product passing from a feed belt to a cook belt, said cook controller resets the timer.

12. A conveyor cooker, comprising:

a conveyor broiler or oven or a combination thereof, including an inlet end with a food product inlet through which uncooked food product is loaded, a cooking chamber, a discharge end having a food product outlet for discharging cooked food product, at least one motorized cook belt for conveying food from said inlet end to said discharge end, and heating elements for heating and cooking food products in said cooking chamber;

a food product loader with a food product conveyor configured to convey uncooked food product across a transition zone and onto said at least one cook belt;

at least one photoelectric sensor system having a light emitter positioned and configured to emit a beam of light laterally across all or a portion of said transition zone and a light receiver positioned and configured so as to receive reflected light from said light emitter so as to detect food product passing through said transition zone; and a controller electrically coupled to said at least one photoelectric sensor system and to said at least one cook belt, said cook controller having a user interface;

wherein said sensor system detects food product moving from said food product loader across said transition zone to said at least one cook belt, and when so detected said controller sets a countdown timer for the recipe to be implemented, locks the recipe used for that particular food product, alerts users to a cook process in progress, and prevents changes to the cook process.

13. The conveyor cooker of claim 12, wherein said light emitter is configured to emit a beam of light at or above an upper plane of said at least one food product conveyor.

14. The conveyor cooker of claim 13, wherein said food product conveyor includes at least one feed belt.

15. The conveyor of claim 12, wherein said controller is coupled to a user interface and is configured to output visual indications that food product is cooking, that a timer for timing the cooking has been started, and that the cook time cannot be altered without specific user inputs acknowledging the visual indications and thereafter changing the cook time.

* * * * *